United States Patent
Riman et al.

(10) Patent No.: US 7,094,361 B2
(45) Date of Patent: *Aug. 22, 2006

(54) OPTICALLY TRANSPARENT NANOCOMPOSITE MATERIALS

(75) Inventors: Richard E. Riman, Belle Mead, NJ (US); John Ballato, Clemson, SC (US)

(73) Assignee: Rutgers, The State University, New Brunswick, NJ (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/791,953

(22) Filed: Mar. 2, 2004

(65) Prior Publication Data

US 2004/0174917 A1  Sep. 9, 2004

Related U.S. Application Data

(63) Continuation-in-part of application No. 09/272,912, filed on Mar. 19, 1999, now Pat. No. 6,699,406.

(51) Int. Cl.
 *C09K 11/02* (2006.01)
(52) U.S. Cl. ............ 252/301.36; 501/32; 252/301.4 R; 252/301.4 F; 252/301.4 S; 252/301.6 S; 252/301.4 H; 313/467; 313/483; 313/485; 313/502
(58) Field of Classification Search ............... None
 See application file for complete search history.

(56) References Cited

U.S. PATENT DOCUMENTS

| | | |
|---|---|---|
| 3,233,189 A | 2/1966 | Guggenheim et al. |
| 3,397,316 A | 8/1968 | Brown et al. |
| 3,801,702 A | 4/1974 | Donohue et al. |
| 3,836,784 A | 9/1974 | Bates et al. |
| 3,872,309 A | 3/1975 | De Belder et al. |
| 4,099,089 A | 7/1978 | Rabatin |
| 4,239,968 A | 12/1980 | Kotera et al. |
| 4,916,360 A | 4/1990 | Mikami et al. |
| 5,013,534 A | 5/1991 | Dissaux et al. |
| 5,076,963 A | 12/1991 | Kameyama et al. |
| 5,455,489 A | 10/1995 | Bhargava |
| 5,541,012 A | 7/1996 | Ohwaki et al. |
| 5,637,258 A | 6/1997 | Goldburt et al. |
| 5,698,397 A | 12/1997 | Zarling et al. |
| 5,788,883 A | 8/1998 | Srivastava et al. ........ 252/301.4 |
| 5,811,924 A * | 9/1998 | Okumura et al. ........... 313/487 |
| 5,891,361 A | 4/1999 | Kane |
| 5,893,999 A * | 4/1999 | Tamatani et al. ..... 252/301.4 R |
| 5,952,666 A | 9/1999 | Nakano et al. .......... 250/484.4 |
| 6,036,886 A * | 3/2000 | Chhabra et al. ...... 252/301.4 R |
| 6,039,894 A | 3/2000 | Sanjurjo et al. |
| 6,113,807 A * | 9/2000 | Yamaura et al. ...... 252/301.4 R |

(Continued)

OTHER PUBLICATIONS

O'Bannon, Loran S., Dictionary of Ceramic Science and Engineering, Plenum Press, p. 56.

(Continued)

*Primary Examiner*—C. Melissa Koslow
(74) *Attorney, Agent, or Firm*—Synnestvedt & Lechner, LLP

(57) ABSTRACT

Optically transparent composite materials in which solid solution inorganic nanoparticles are dispersed in a host matrix inert thereto, wherein the nanoparticles are doped with one or more active ions at a level up to about 60 mole % and consist of particles having a dispersed particle size between about 1 and about 100 nm, and the composite material with the nanoparticles dispersed therein is optically transparent to wavelengths at which excitation, fluorescence or luminescence of the active ions occur. Luminescent devices incorporating the composite materials are also disclosed.

16 Claims, 2 Drawing Sheets

U.S. PATENT DOCUMENTS

| | | | |
|---|---|---|---|
| 6,117,363 A | * | 9/2000 | Ihara et al. ............ 252/301.6 S |
| 6,699,406 B1 | * | 3/2004 | Riman et al. ........... 252/301.36 |
| 2003/0030067 A1 | * | 2/2003 | Chen ........................... 257/102 |

OTHER PUBLICATIONS

Ballato et al., "Sol-gel synthesis of rare-earth-doped fluoride glass thin films," J. Mater, Res., 11(4), 841-9 (1996).

Ballato et al., "Sol-gel synthesis of rare-earth doped lanthanium halides for highly efficient 1.3μm optical amplification," Opt. LEtt., 22(10), 691-693 (1997).

Kudryavtseva et al., "Solubility of LnF3 lanthanum fluoride," Sov. Phys. Crystallogr., 18(4), 531 (1974).

Ballato et al., "Fabrication of fibes with high-rare-earth concentrations for Faraday isolator applications," Appl. Opt., 34(30), 6848-54 (1995).

* cited by examiner

OPTICALLY TRANSPARENT NANOCOMPOSITE MATERIALS

CROSS-REFERENCE TO RELATED APPLICATION

The present invention is a Continuation-In-Part of U.S. patent application Ser. No. 09/272,912 filed Mar. 19, 1999, now U.S. Pat. No. 6,699,406, the disclosure of which is incorporated by reference.

BACKGROUND OF THE INVENTION

The present invention relates to composite materials having dispersed therein optically transparent solid solution inorganic nanoparticles doped with one or more active ions. The present invention also relates to luminescent devices incorporating the composite materials.

Halide salts have received world-wide attention as materials for a myriad of photonic applications. This results from a chemistry in which the ionic species are of generally greater atomic mass and weaker bonding than oxide-based compounds. This intrinsically results in a greatly enhanced theoretical transparency-hence there is substantial interest from telecommunication companies looking for ultra-low loss halide (predominantly fluoride) optical fibers for long-haul communications. When halide materials are doped with luminescent ions (e.g., the rare-earths), the weak bonding between relatively heavy atoms further results in a reduced influence of the host on the dopant, thereby causing radiative emissions. Accordingly, the halides are said to be of low-phonon energy and thereby enabling of a wealth of applications. Pertinent examples are optical amplifiers at the 1.3 µm telecommunications window, upconversion light sources providing virtually any emission across the near-ultraviolet, visible, and near-infrared spectrum, color display materials (flat panel phosphors and volumetric monoliths), and long-wavelength sources for infrared imaging, atmospheric sensing, and military counter-measures. Collectively, these few applications represent a multi-trillion-dollar-per-year commerce.

Unfortunately, in most cases, conventional processing methods have failed in their efforts to produce optical components such as fibers with the promised near-intrinsic material properties much less expensively. Resultantly, rare-earth doped halide amplifiers are sold on a very small scale by a very small number of companies. Only applications utilizing relatively small-scale consumption of halide materials currently are sought-generally based on the halides' low-phonon energy nature and resultant luminescent properties.

In particular, conventional processing methods have failed to produce significant concentrations of rare earth element ions in metal halide salts. Jones et al. *J. Crystal Growth*, 2, 361–368 (1968) discloses that the concentrations of rare earth ions in $LaF_3$ crystals grown from a melt is limited to levels ranging from 25 mole percent for samarium (Sm) to less than 1 mole percent for ytterbium (Yb). Only cerium (Ce), praseodymium (Pr) and neodymium (Nd) are disclosed as being completely soluble in $LaF_3$.

Kudryavtseva et al., *Sov. Phys. Crystallogr.*, 18(4), 531 (1974) disclosed that higher solubilities can be obtained when melt-grown crystals are quenched into water. The disclosed improved solubilities in $LaF_3$ range from 65 mole percent for Sm down to 5 mole percent for lutetium (Lu).

Neither prior art publication discloses the direct preparation of rare earth element doped metal halide salt nanoparticles. A need exists for a method by which such particles may be directly prepared, as well as for materials having increased levels of rare earth element dopants from terbium (Tb) to Lu.

Furthermore, to have a significant optical function where optical transparency is required, light must be able to propagate a reasonable distance with very little of the light attenuated. Optical attenuation is a measure of optical loss and is expressed in units of decibels per unit length. Attenuation is defined on a logarithmic scale, wherein a factor of two difference in attenuation represents a 100-fold difference in intensity.

Prior art phosphor particles are disclosed for use in applications wherein optical transparency is not critical, such as electroluminescent displays, printing inks and biological markers. For purposes of the present invention, an "optically transparent composite material" is defined as a material in which the particles dispersed therein do not scatter wavelengths critical to the end-use application. At the very least, scattering of excitation and emissive wavelength does not occur to the extent that detection of the emissive wavelength for the particular end-use application is impaired. An "optically transparent composite material" may in addition be transparent to visible spectra wavelengths. For example, the transparency required for telecommunications components at conventionally used visible and IR wavelengths differs from that which is considered transparent to the naked human eye. Window glass has an attenuation of 1000 db/km, which is not suitable for telecommunications. The optical fibers used in telecommunications are fabricated from high purity silica glass with an attenuation of 0.2 db/km. Even though both materials are transparent to the naked human eye, only one is suitable for telecommunications.

Optical loss cannot be adequately controlled for telecommunications purposes using prior art phosphor particles disclosed for use in electroluminescent displays, printing inks and biological markers. While particle sizes as small as 100 nm are disclosed, this is the primary size of inorganic particles that agglomerate to form secondary particles significantly greater than 100 nm in diameter. There remains a need for phosphor particles having a dispersed particle size below 100 nm.

SUMMARY OF THE INVENTION

The present invention addresses these needs. It has now been discovered that the importance of using particles with a dispersed particle size less than 100 nm was more important than originally believed. Particles dispersed in a polymer matrix will have some finite difference in refractive index. This index difference leads to scattering of light, which is the major cause of optical attenuation for composite materials. For particles between 10 nm and one micron, the amount of light scattered is roughly proportional to the sixth power of the particle diameter. Thus, a ten-fold difference in particle size will reduce scattering by a factor of one million, and a 100-fold difference will reduce scattering by a factor of one billion.

The present invention incorporates the discovery that not only does choosing particles with a dispersed particle size less than 100 nm over particles with a dispersed particle size greater than 100 nm produce a very large difference in light scattering and attenuation in composite materials, a dispersed particle size less than 100 nm is critical to forming composite materials with the level of optical transparency needed for telecommunication applications. Therefore, according to one aspect of the present invention, an optically transparent composite material is provided in which solid solution inorganic nanoparticles are dispersed in a host matrix inert thereto, wherein the nanoparticles are doped with one or more active ions at a level up to about 60 mole percent and consist of particles having a dispersed particle size between about 1 and 100 nm, and the composite material with the nanoparticles dispersed therein is optically transparent to wavelengths at which excitation, fluorescence or luminescence of the active ions occur.

Essentially, any material that is optically transparent as defined herein is suitable for use as the host matrix. The host matrix can be a polymer, glass, liquid or crystalline material. The present invention incorporates the discovery that particle sizes below 100 nm are small enough that even a large refractive index difference between the matrix and the particles would not scatter the light in directions other than the intended direction.

The nanoparticles can be prepared from essentially any optically transparent inorganic material capable of being doped with one or more active ions. Suitable inorganic materials include ceramic materials such as oxides, halides, oxyhalides and chalcogenides of metals such as lanthanum (La), lead (Pb), zinc (Zn), cadmium (Cd), and the Group II metals of the Periodic Chart, e.g., beryllium (Be), magnesium (Mg), calcium (Ca), strontium (Sr) and barium (Ba). Group III metal ceramics can also be used, such as aluminosilicates. Group III, Group IV and Group V semiconductor elements, and Group III–V, Group II–V and Group II–VI semiconductor compounds may also be used, including, but not limited to, silicon (Si), arsenic (As), gallium (Ga), gallium arsenide (GaAs), gallium nitride (GaN), indium nitride (InN) and the like.

The active ions are typically rare earth elements. However, essentially any ion that will absorb IR wavelengths and emit in either the IR or visible spectra can be used, for example, chromium. In the present invention, the active ions entirely reside in individual low-phonon energy nanoparticles, thereby not being influenced by the ions of other particles. Incorporation of the nanoparticles into a passive host matrix thus obviates the problems encountered with ion-ion energy transfer, cross-relaxation, upconversion, and the like, when each of the active species reside in their respectively doped particles.

Glass matrices into which the inventive nanoparticles may be dispersed are ubiquitous. Crystalline materials are also well-known, and include essentially any transparent polycrystalline material with a grain size small enough so that the materials do not scatter light. Examples include yttrium oxide, aluminum oxynitride (ALON), and the like. Optically transparent inert liquids are also readily identified to one of ordinary skill in the art guided by the present specificaion.

Non-porous materials are preferred. Glass and crystalline matrices should not contain a significant number of pores larger than 100 nm, otherwise the utility of the present invention is impaired. Pores, if present, should be instead be significantly smaller than 100 nm.

Matrix polymers suitable for use with the present invention include thermosetting and thermoplastic organic polymers free of intrinsic optical absorptions that would be a detriment to absorption, fluorescence or luminescence by the active ion. For example, for infrared wavelengths, non-infrared absorbing polymers may be used. Each nanoparticle dispersed in the polymer matrix may be doped with a different active species. The composites of the present invention are easily formed and readily fiberizable.

The composite materials of the present invention contain highly doped nanoparticles that exhibit broader absorption and luminescence than observed from corresponding prior art materials doped in lower concentrations, in part because of the optical transparency, is transmitted at a level of efficiency heretofore unseen, thereby increasing the transfer and reception of infrared signals. Furthermore, the optical transparency of the nanoparticles permit particle loading levels that further enhance this effect. Optically transparent composite materials with particle loading levels as high as 60 vol. % can be attained. Typically, particle loading will be between about 1 and about 30 vol. %.

This broadened emission band is advantageous for many luminescent devices, which also take advantage of the versatility of a reduced phonon energy environment. The emission band can be broadened further by combining a plurality of different nanoparticles whose emissions are close to one another by virtue of the choice of host material or active ion dopants and upon excitation, fluorescence or luminescence emit a plurality of overlapping emission bands. The emission band can also be separated into distinct spectral lines by combining a plurality of different nanoparticles, which, through the choice of host material or active ion dopants, emit a plurality of separate and distinct emission bands upon excitation, fluorescence or luminescence.

Therefore, according to still another aspect of the present invention, a luminescent device is provided incorporating the composite of the present invention. Examples of luminescent devices include zero-loss links, wavelength-division-multiplexing devices, upconversion light sources, standard light sources, and the like. Volumetric displays based on the composites of the present invention exhibit greatly enhanced performance, easier fabrication and reduced weight.

Composites of nanoparticles doped with different active species exhibit ultra-broad band emissions attributable to the additive effects of the individual dopants, all of which are transmitted with high efficiency. This broadened emissions band is advantageous for the fabrication of sources operating in wavelength-division-multiplexing schemes.

The foregoing and other objects, features and advantages of the present invention are more readily apparent from the detailed description of the preferred embodiments set forth below, taken in conjunction with the accompanying drawings.

DETAILED DESCRIPTION OF THE PREFERRED EMBODIMENTS

Figure 1:
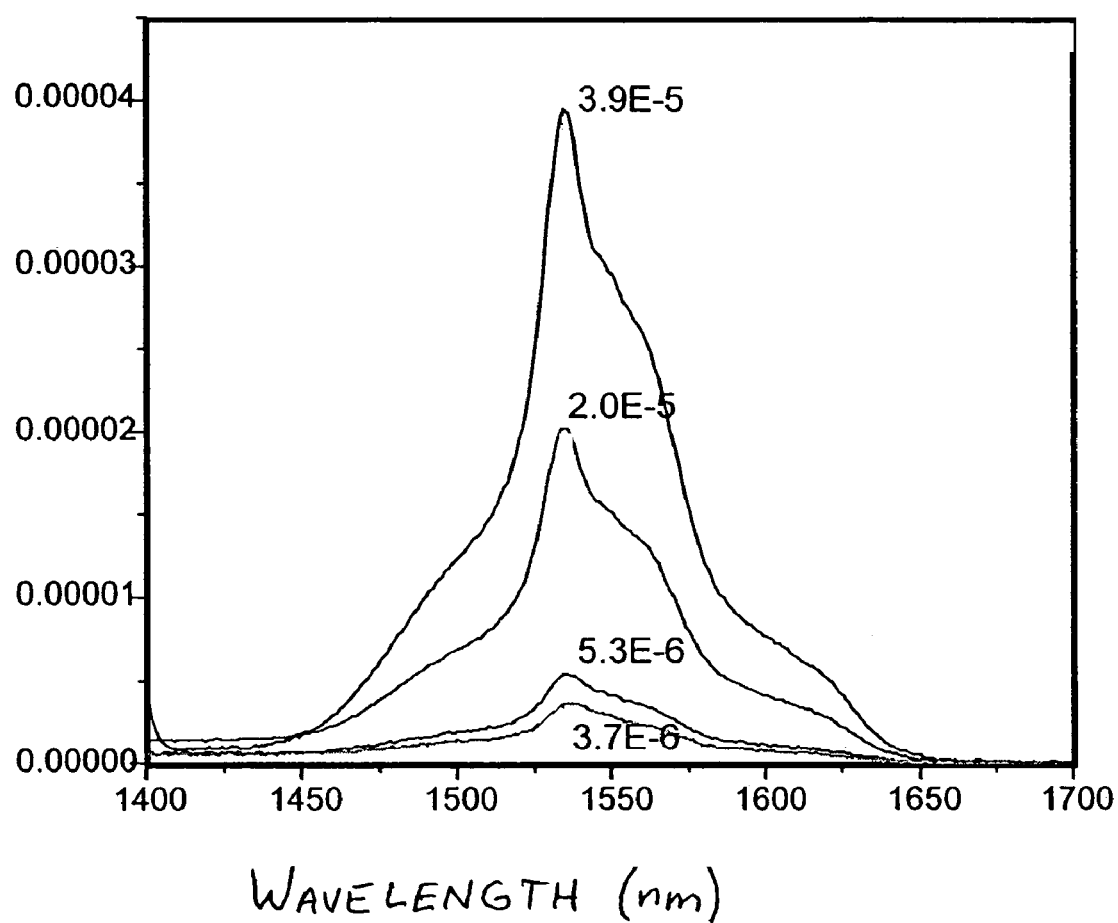
FIG. 1 depicts IR emission as a function of particle loading for erbium doped aluminosilicate nanoparticles dispersed in a fluoropolymer matrix.

Rare earth element doped metal halides and oxyhalides can be prepared by the two distinct methodologies disclosed in U.S. Pat. No. 6,699,496. Both processes can also be readily adapted to other active ions. In one method, the synthesis is performed by a reactive atmosphere treatment of multicomponent metal hydrous oxides, for example, by reaction with a halogenating gas. The method heats a substantially homogeneous multicomponent starting material containing a halide-forming metal and halide-forming active ion compound, with an excess of a hydrogen halide or a halogenating gas in an atmosphere substantially free of water vapor at a temperature at which halogenation will occur, the temperature preferably being below the melt temperature of the lowest melting point component of the mixture.

The starting material may be a homogeneous physical mixture of compounds of the individual components (e.g., a mixture of nanosized particles) or a singular compound combining all of the components on an atomic scale of uniformity. Halide forming compounds include oxides, hydrous oxides and hydroxides.

Preferred halide-forming metals and active ions also form water-insoluble hydroxide precipitates. According to this process, water-soluble salts of the metals are dissolved in water at a temperature at which the salts will dissolve, and a molar equivalent of $NH_4OH$ is added to the water to precipitate the metal hydroxides.

For example, halide salts, preferably chloride salts, of La, Pb, Zn, Cd or a metal of Group II, i.e., Be, Mg, Ca, Sr and Ba, are dissolved in water, preferably water that has been triply-deionized. To illustrate, $CaCl_2$ is dissolved in water at a temperature at which the salt will dissolve, typically room temperature up to about 90° C. For purposes of the present invention, room temperature is defined as 20° C.

Also added to the solution is a stoichiometric quantity of one or more water-soluble salts of the desired active ions at the desired level of doping. Rare earth element halide salts, for example, preferably chloride salts, can be used. Among the rare earth elements, Tb, Dy, Ho, Er, Tm, Yb and Lu are preferred. However, any of the rare earth elements can be used alone or in combinations, including combinations of preferred and non-preferred rare earth elements, and with or without other active ion species.

To obtain nanoparticles of a metal halide salt containing 10 mole percent active ion dopant, quantities of active ion halide salts and metal halide salts are added to the solution in amounts that provide 10 mole percent of active ions relative to the total metal ion content of the solution. Suitable water-soluble rare earth element salts include chloride salts such as $RECl_3.6H_2O$, wherein RE is a rare earth element.

The active ions and the ions of the metal halide are precipitated from solution as insoluble multicomponent oxides, hydrous oxides and hydroxides by the addition of a stoichiometric excess of $NH_4OH$. The precipitate should be washed with water, preferably triply-deionized, to remove the ammonium halide reaction by-product. Preferably, the precipitate is washed several times, and then dried, preferably by heating, for example, at 90° C. for 24 hours. Alternatively, the ammonium halide can be removed by sublimation.

The dried precipitate is then subjected to reactive atmospheric processing. The precipitate is placed in an oven, for example a muffle-tube furnace, which is purged with inert gas, such as nitrogen gas, and then heated at a rate between about 1 and about 50 C°/minute, and preferably 10 C°/minute, to a temperature at which halogenation of the hydroxides will occur without melting the lowest melting point component of the mixture. Preferably, the hydroxides are heated to a temperature between about 100 and about 600° C., and more preferably to a temperature between about 200 and about 300° C.

The hydrogen halide corresponding to the halide salt to be formed is then introduced into the nitrogen flow to form a gas mixture. Thus, to form a metal fluoride salt doped with one or more rare earth elements, hydrogen fluoride is introduced into the nitrogen flow, and to form a metal chloride salt doped with one or more rare earth elements, hydrogen chloride is introduced into the nitrogen flow. The hydrogen halide is preferably anhydrous, with halides of fluorine and chlorine preferred. Other halogenation gases may be used as well, including aprotic gases such as $SF_6$ or $NF_3$. $H_2S$ may be used to form metal sulfides. Other chalcogenides can be formed using related hydrogen compounds.

The precipitate quantitatively converts to the respective halide. Depending upon the quantity of hydrogen halide used, a halide or oxyhalide compound is formed. Depending upon the temperature at which the oven is heated, the conversion takes place within about one-half to about two hours, after which the introduction of the hydrogen halide to the nitrogen flow is discontinued and the oven is cooled to room temperature under the flowing nitrogen atmosphere.

According to the other method, the active ion doped metal halide and oxyhalide salts may be prepared from an aqueous solution by dissolving a water-soluble salt of a halide-forming metal in water with an excess of a water-soluble salt of the one or more active ion dopants, so that an aqueous solution of ions of the halide-forming metal and the active ions of dopants is formed, then dissolving in the aqueous solution an excess of an ammonium halide and precipitating from the aqueous solution nanoparticles of a metal halide salt doped with one or more active ions. Again, the halide-forming metal is preferably La, Pb, Zn, Cd or a metal of Group II, i.e., Be, Mg, Ca, Sr and Ba. And among the rare earth elements, Tb, Dy, Ho, Er, Tm, Yb and Lu are again preferred. However, once again any of the rare earth elements can be used alone or in combinations, including combinations of preferred and non-preferred rare earth elements, and with or without other active ion species.

An aqueous solution of active ions and halide-forming metal ions are prepared as in the reactive atmosphere method. A stoichiometric excess of the active ions may be employed. Excess ammonium halide is then added to the solution, which is selected to provide the desired halide anions for the resulting rare earth element doped metal halide salt. Ammonium fluorides and chloride are the preferred for halogenation.

The solution is then stirred at a temperature at which all of the salts of the ammonium halide are soluble in water at the quantities employed, typically between about room temperature and about 90° C. Stirring continues until the halogenation of the active ions and host metal ions is essentially complete, typically between about fifteen minutes and about five hours, and depending upon whether a halide or oxyhalide is desired. The reaction time decreases with increasing temperature.

The particles are then precipitated from the solution in the form of nanosized particles. When the halide is a fluoride, precipitation is not necessary, because the fluorides are water-insoluble. For chlorides and higher halides, precipitation is obtained by adding a polar organic solvent to the solution in an quantity effective to precipitate the doped metal salt.

The precipitate is washed with water by the same technique employed to purify the precipitates of the reactive atmosphere treatment. However, the precipitated particles are then centrifuged to ensure complete removal of $NH_4OH$ or any other ammonium by-product.

The preparation of nanoparticle-sized active ion doped oxides, chalcogenides and Group III–V, Group II–V and Group II–VI semiconductor compounds and Group IV and Group V semiconductor elements is well known to those skilled in the art. Oxides, for example, including aluminosilicates, can be made by hydrothermal methods, flame oxidation methods, plasma synthesis methods, the hydrolysis and polymerization of metal alkoxides, and by microemulsion precipitation. Related techniques can be used to prepare nanoparticle-sized doped chalcogenides.

In addition to aluminosilicates, the metal oxides and chalcogenides that are doped with active ion species include oxides and chalcogenides of La, Pb, Zn, Cd or a metal of Group II, i.e., Be, Mg, Ca, Sr and Ba. Nanoparticle-sized active ion doped Group III–V, Group II–V and Group II–VI semiconductor compounds and active ion doped Group IV and Group V semi-conductor elements are prepared by known techniques for preparing nanoparticles of these materials modified to incorporate soluble compounds of the dopant active ion. Again, the rare earth elements Tb, Dy, Ho, Er, Tm, Yb and Lu are preferred. Any of the rare earth elements can be used alone or in combinations, including combinations of preferred and non-preferred rare earth elements, with or without other active species.

Nanoparticles according to the present invention are defined as having a dispersed particle size less than 100 nm. Preferred nanoparticles have a dispersed particle size between about 10 and about 50 nm, and more preferably between about 15 and about 25 nm. While active ion levels as high as 60 mole % can be attained, particles with parts per thousand, parts per million or parts per billion active ion levels also have utility, in part because of the optical transparency of the composite materials.

Composite materials in which the nanosized particles of the present invention are dispersed in a matrix chemically inert thereto may be prepared by essentially conventional techniques. Dispersions in both glass and polycrystalline matrices can be prepared by sol-gel processes, as well as by conventional powder and melt techniques, and by solid and viscous sintering processes, in all of which the nanoparticles are processed with the matrix materials. Alternatively, the nanosized particles may be precipitated into the matrix material by a variety of methods, such as crystallization in a glass, or primary or secondary crystallization in a polycrystalline matrix.

The matrix materials include glass, crystalline materials and polymeric materials. Inert, optically transparent liquids can also be used. Polymeric materials are preferred for their inertness toward active ion doped nanoparticles and their low processing temperatures. The matrix material should have excellent optical transparency at wavelengths at which excitation, fluorescence or luminescence of the active ion occurs, and good film-forming characteristics. One type of "optically transparent" composite materials according to the present invention have an attenuation of less than 100 dB/cm, preferably less than 10 dB/cm, and more preferably less than 1 dB/cm. Other properties will come into consideration, depending upon the particular end-use requirements of the materials; however, these properties are well understood by those of ordinary skill in the art.

Examples of crystalline materials include yttrium oxide, aluminum oxynitride, and the like. Typically, host polymers for infrared wavelengths are fluoropolymers such as poly (vinylfluoride), poly(vinylidenefluoride), perfluorocyclobutyl polymers and copolymers, fluorinated polyimides, CYTOP amorphous fluoropolymers from Bellex International Corp. (Wilmington, Del.), TEFLON AF (an amorphous poly(vinylfluoride)), TEFLON PFA (a perfluoroalkoxy copolymer), and the like. Other suitable polymers include acrylates (such as PMMA), halogenated acrylates, benzo-cyclobutenes, polyetherimides, siloxanes such as deuterated polysiloxanes, and the like.

The dispersion of the nanosized particles into the matrix to form the composite should be performed at a temperature at which the inorganic nanoparticle remains a separate phase within the matrix, which is readily apparent to one of ordinary skill in the art.

Luminescent devices assembled from the composite materials of the present invention are also novel and non-obvious, and meet the need for articles with luminescent properties that are nanostructured so as not to interfere with the optical properties of the devices in which they are employed. Composite materials can be employed to produce a variety of useful articles with valuable optical properties. The composites can be readily processed by conventional techniques to yield optical fibers, bulk optics, films, monoliths, and the like. Optical applications thus include the use of the composite materials to form the elements of zero-loss links, upconversion light sources, standard light sources, volumetric displays, flat-panel displays, sources operating in wavelength-division-multiplexing schemes and the like.

The following non-limiting examples set forth below illustrate certain aspects of the invention. All parts and percentages are molar unless otherwise noted and all temperatures are in degrees Celsius.

EXAMPLES

Materials:

The matrix polymer was 6F, a perfluorocyclobutyl (PFCB) polymer copolymerized with 2,2-bis(4-hydroxyphenyl)-1,1,1,3,3,3-hexafluoropropane obtained from Tetramer Technologies of Clemson, S.C. The $M_n$ of the polymer was 31,000 and $T_g$ was 114° C. The refractive index of the polymer was about 1.4 at 1550 nm. The polymer was selected for its low intrinsic absorption over a wide wavelength range. SAE powder ($SiO_2$—$Al_2O_3$—$Er_2O_3$, 96 wt % for silica, 2 wt % and 2 wt % for $Al_2O_3$ and $Er_2O_3$) had a particle size in the range of 10–20 nm and was prepared by the Combustion Flame-Chemical Vapor Condensation (CF-CVC) method. The SAE powder was graciously provided by Professors Bernard Kear and George H. Sigel, which is gratefully acknowledged. Ho-doped $LaF_3$ nano-powder (holmium, 2 mol %) was prepared using the solvothermal method in a mixture of ethylene glycol/water (10/1, v/v). The particle size was in the range of 5–10 nm according to TEM observations. N,N-dimethylacetamide (DMA) and toluene from Aldrich Chemicals were used directly for the preparation of ceramic/6F nanocomposites.

Example 1

Preparation of SAE/6F Nanocomposites 10 wt % of 6F polymer solutions were used to prepare all the ceramic/polymer nano-composites. The SAE solid loadings in 6F polymer were 3, 5, 10, and 20 wt %. For example, 0.192 g of 6F polymer was dissolved in 1 ml toluene. 10 wt % (0.021 g) SAE was mixed with 1 ml toluene and ultrasonicated for 15 minutes (Ultrasonicator, Model FS30, Fisher Scientific, Fair Lawn, N.J.). The SAE/toluene suspension was mixed with 6F polymer solution by ultrasonicating for an additional 15 minutes. The SAE/6F composite with 10 wt % SAE loading was cast on a glass slide and oven dried at 50° C. (Isotemp® Oven, model 230Gm Fisher Scientific, Pittsburgh, Pa.). The was repeated for each level of SAE loading. IR emission spectra are shown in FIG. 1, with 3.9 E-5 corresponding to 20 wt % SAE, 2.0 E-5 corresponding to 10 wt % SAE, 5.3 E-6 corresponding to 5 wt % SAE and 3.7 E-6 corresponding to 3 wt % SAE.

Example 2

Preparation of Ho-doped $LaF_3$/6F Nanocomposites

Ho—$LaF_3$/6F composites were prepared as in Example 1. For example, 0.192 g 6F polymer was dissolved in 1 ml toluene. 10 wt % (0.021 g) Ho—$LaF_3$ was mixed with 1 ml toluene and ultra-sonicated for 15 minutes. The Ho—$LaF_3$/toluene suspension was mixed with the 6F polymer solution by ultrasonicating for an additional 15 min. The Ho—$LaF_3$/6F composite was cast on a glass slide and oven dried at 50° C.

Example 3

Preparation of Er—Yb-doped $CaF_2$ Nanocomposites

Er—Yb-$CaF_2$ (Er, 8 mol %; Yb, 4 mol %) was prepared by the solvothermal method in a solvent mixture of ethylene glycol/water (6.5/1, v/v). At room temperature, a solution of $Er(OAc)_3$ (0.64 mmol), $Ca(NO_3)_2$ (8 mmol) and $Yb(NO_3)_3$ (0.32 mmol) in 22 ml water was added dropwise into an $NH_4F$ (18 mmol) ethylene glycol/water solution while stirring. The reaction mixture was stirred at refluxing temperature for 2 hours and cooled to room temperature. The precipitate was separated by centrifugation (15 minutes at 18,000 rpm) and washed with ethanol/water (v/v, 1:1) two times and DI water two times. The product was lyophilized for 48 hours.

XRD analyses were carried out by a Kristalloflex D-500 powder diffractometer using Ni filtered Cu Kα radiation. The samples were scanned in the 2θ range of 10–70°, at a step size of 0.05 (°/step). Crystallographic identification of the as-prepared $CaF_2$ powders was accomplished by comparing the experimental XRD patterns to standards compiled by the Joint Committee on Powder Diffraction and Standards (JCPDS; $CaF_2$, PDF#75-0363).

The particle size and distribution of the Er—Yb-doped $CaF_2$ in water was determined by dynamic light scattering (DLS, ZetaPals Particle Sizer, Brookheven Instruments Corp) at a wave-length of 658 nm. Samples for the DLS measurements were prepared by dispersing a small amount of Ho-doped $CaF_2$ powder in water followed by ultrasonic bath for 10 minutes.

Transmission Electron Microscopy (TEM) images were obtained with a high-resolution analytical electron microscope (model EM-002B, International Scientific Instruments) at an acceleration voltage of 200 kV. The specimens were prepared by slow evaporation of a drop of the sample suspension deposited onto a copper grid with carbon film. The particle size was in the range of 10–20 nm according to the TEM measurements.

DMA was used as the solvent for the preparation of Er—Yb—$CaF_2$/6F nanocomposites as in Example 1. For example, 0.168 g of 6F polymer was dissolved in 0.5 ml DMA. 10 wt % (0.0187 g) Er—Yb—$CaF_2$ was mixed with 0.5 ml DMA and ultrasonicated for 15 min. The Er—Yb—$CaF_2$/DMA suspension was mixed with 6F polymer solution by ultrasonicating for an additional 15 minutes. The Er—Yb—$CaF_2$/6F composite was cast on a glass slide and oven dried at 70° C.

Figure 2:
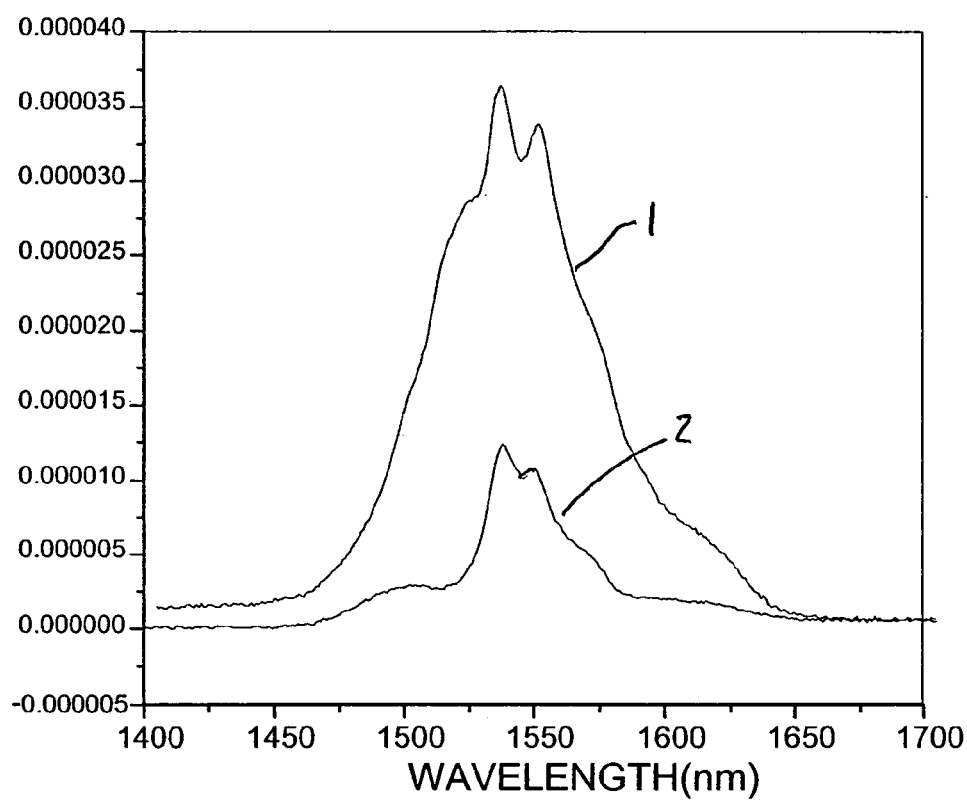
FIG. 2 compares the IR spectra of Er—Yb-doped $CaF_2$ nanoparticles dispersed in a fluoropolymer matrix to the IR spectra of the same parties dispersed in ethanol.

A comparison of the emission spectra for the polymer composite (1) to the emission spectra for the same Er—Yb—$CaF_2$ nanoparticles dispersed in ethanol (2) is shown in FIG. 2. The intensity of the polymer composite spectra is higher because of greater particle loading. However, the comparison demonstrates the optical transparency of the composite. FIG. 2 also demonstrates the use of ethanol as a liquid host matrix. Other inert transmissive solvents, such as carbon tetrachloride can be used.

The present invention thus provides composite materials having levels of quantum efficiency heretofore not achieved. The increased emission intensity allows for greater distances to be employed between amplifiers, and permits the denser packing of information in light-readable formats, an increase in laser power output, improvements in display color quality and control of individual spectral line intensity as a function of wavelength (gain leveling).

Because of the broadened emission bandwidths of the particles of the present invention, dispersions in an appropriate matrix will also produce a bulk material with bandwidth breadth heretofore not achieved. This increases the number of signals that can be transmitted by wavelength-division-multiplexing. These properties are advantageous for many optical end-use applications.

The foregoing examples and description of the preferred embodiment should be taken as illustrating, rather than as limiting, the present invention as defined by the claims. As would be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. An optically transparent composite material comprising solid solution inorganic nanoparticles dispersed in a host matrix inert thereto, wherein said nanoparticles are doped with one or more active ions at a level up to about 60 mole% and consist of particles having a dispersed particle size between about 1 and about 100 nm and said composite material with said nanoparticles dispersed therein has an attenuation of less than 10 dB/cm and is optically transparent to wavelengths at which excitation, fluorescence, or luminescence of said active ions occur.

2. The composite material of claim 1, wherein at least one active ion is a rare earth element.

3. The composite material of claim 1, wherein said inorganic nanoparticles comprise at least one metal oxide, halide, oxyhalide or chalcogenide salt.

4. The composite material of claim 3, wherein said metal inorganic nanoparticles are selected from the group consisting of aluminosilicates, ZnS, ZnSe, PbS, PbSe, CdS and CdSe nanoparticles.

5. The composite material of claim 3, wherein said inorganic nanoparticles comprise at least one metal fluoride or chloride salt.

6. The composite material of claim 1, wherein said inorganic nanoparticles comprise at least one Group III, IV, or V semiconductor element, or at least one Group III–V, Group II–V, or Group II–VI semiconductor compound, doped with one or more active ions.

7. The composite material of claim 6, wherein said inorganic nanoparticles comprise at least one Group III, IV, or V semiconductor element selected from the group consisting of Si, Ga and As, doped with one or more active ions.

8. The composite material doped of claim 6, wherein said inorganic nanoparticles comprise at least one Group III–V semiconductor compound selected from the group consisting of GaAs, GaN and InN.

9. The composite material of claim 1, wherein said host matrix is an optically transparent material selected from the group consisting of optically transparent glass, optically transparent crystalline materials, optically transparent liquids and optically transparent polymers, wherein said host matrix is optically transparent to wavelengths at which excitation, fluorescence or luminescence of said active ions occur.

10. The composite material of claim 9, wherein said host matrix is a fluoropolymer.

11. The composite material of claim 1, comprising between about 1 and about 60 vol.% nanoparticles.

12. A luminescent device comprising an optical element formed from the composite material of claim 1.

13. The luminescent device of claim 12, wherein said device is a zero-loss link, upconversion light source, standard light source, volumetric display, flat panel display, or a source operating in a wave length/division/multiplexing scheme.

14. The luminescent device of claim 12, comprising a plurality of different nanoparticles that, by virtue of the choice of host material or active ion dopant, upon excitation, fluorescence, or luminescence emit a plurality of overlapping emission bands.

15. The luminescent device of claim 12, comprising a plurality of different nanoparticles that, by virtue of the choice of host material or active ion dopant, upon excitation, fluorescence or luminescence, emit a plurality of separate and distinct emission bands.

16. The luminescent device of claim 15, wherein said device is a volumetric display or a flat panel display.

* * * * *